C. W. PAGETT.
Curry-Comb.

No. 207,673.                    Patented Sept. 3, 1878.

WITNESSES:
Henry N. Miller
C. Sedgwick

INVENTOR:
C. W. Pagett
BY Munn & Co
ATTORNEYS.

UNITED STATES PATENT OFFICE.

CHARLES W. PAGETT, OF KEOKUK, IOWA.

IMPROVEMENT IN CURRY-COMBS.

Specification forming part of Letters Patent No. 207,673, dated September 3, 1878; application filed July 6, 1878.

*To all whom it may concern:*

Figure 1:
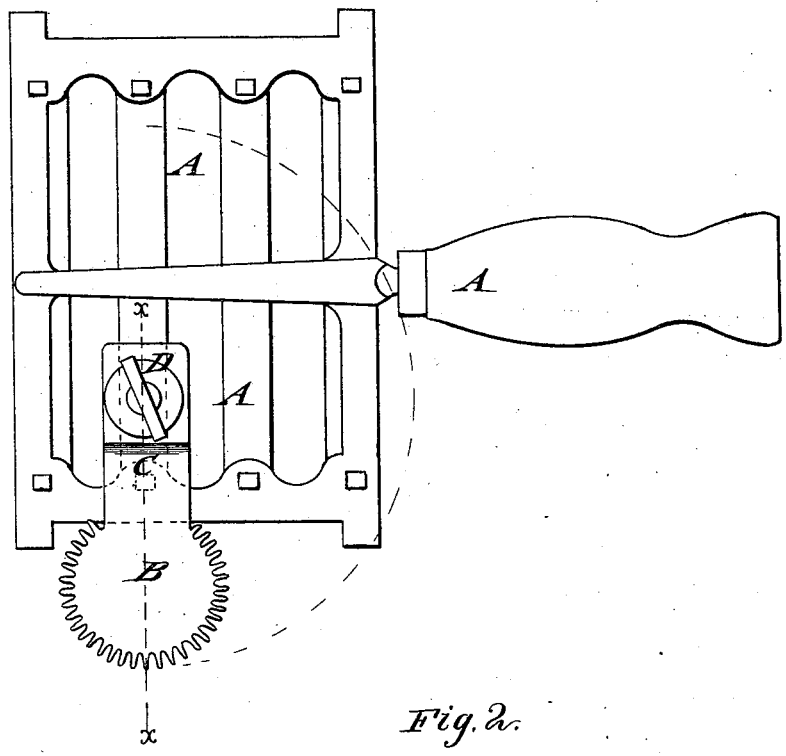
Figure 2:
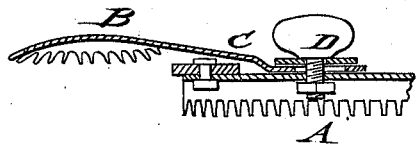

Be it known that I, CHARLES W. PAGETT, of Keokuk, in the county of Lee and State of Iowa, have invented a new and Improved Curry-Comb Attachment, of which the following is a specification:

In the accompanying drawings, Figure 1 represents a top view of a curry-comb with my improved attachment, and Fig. 2 a vertical transverse section of the same on line $x$ $x$, Fig. 1.

Similar letters of reference indicate corresponding parts.

This invention relates to an improved attachment to curry-combs, so that not only the flat surfaces, but also the fetlocks and all depressions of the limbs, may be cleaned in easy and reliable manner; and the invention consists of a convexo-concave disk having radial teeth, the disk being secured by clamp-screw or otherwise to the curry-comb, so as to be extended beyond the comb or be turned back over the same.

Referring to the drawings, A represents a curry-comb of the usual construction, and B an attachment made of disk, oval, or other shape. The attachment B is fastened by an extension-plate, C, to the back of the comb, either by a clamp-screw, D, or by any other locking mechanism. By unscrewing the clamp-screw the attachment can be turned back over the comb, so as not to interfere in any manner with the use of the comb.

The disk-shaped part of the attachment B extends, when in use, beyond one side of the comb, the disk being toothed at the circumference and made convexo-concave, so that the teeth have a slight downward inclination. The teeth radiate from the disk, and correspond in size and shape with the teeth of the curry-comb.

By the toothed attachment the fetlocks and all depressions of the limbs that cannot be cleaned by the curry-comb can be readily reached and thoroughly cleaned of dirt in convenient manner, the attachment forming a cheap and useful auxiliary to the curry-comb.

Having thus described my invention, I claim as new and desire to secure by Letters Patent—

1. The concavo-convex disk-plate B, notched on its circumference and arranged at one side of a curry-comb, as and for the purpose specified.

2. The disk-plate B, attached to curry-comb by extension C and clamp-screw D, as shown and described.

CHARLES WILLIAM PAGETT.

Witnesses:
CHAS. E. LAMB,
JOHN L. ROLLINS.